United States Patent
Santosuosso (10) Patent No.: US 8,429,201 B2
(45) Date of Patent: Apr. 23, 2013

(54) UPDATING A DATABASE FROM A BROWSER

(75) Inventor: John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2477 days.

(21) Appl. No.: 10/007,713

(22) Filed: Nov. 13, 2001

(65) Prior Publication Data

US 2003/0093400 A1   May 15, 2003

(51) Int. Cl.
G06F 17/30 (2006.01)

(52) U.S. Cl.
USPC .......................................................... 707/803

(58) Field of Classification Search .................. 707/634, 707/668, 690, 691, 699, 792, 803, 804
See application file for complete search history.

(56) References Cited

U.S. PATENT DOCUMENTS

| | | | | |
|---|---|---|---|---|
| 5,761,683 A * | 6/1998 | Logan et al. | ................... | 715/513 |
| 6,065,012 A * | 5/2000 | Balsara et al. | ......................... | 1/1 |
| 6,094,681 A * | 7/2000 | Shaffer et al. | ................. | 709/224 |
| 6,240,455 B1 * | 5/2001 | Kamasaka et al. | ............ | 709/229 |
| 6,253,204 B1 * | 6/2001 | Glass et al. | ................... | 707/102 |
| 6,321,242 B1 * | 11/2001 | Fogg et al. | .................... | 715/513 |
| 6,578,078 B1 * | 6/2003 | Smith et al. | ................... | 709/224 |
| 2002/0143878 A1 * | 10/2002 | Birnbaum et al. | ............ | 709/205 |
| 2003/0189593 A1 * | 10/2003 | Yarvin | .......................... | 345/762 |

* cited by examiner

*Primary Examiner* — Cam-Linh Nguyen
(74) *Attorney, Agent, or Firm* — Patterson & Sheridan, LLP (57) ABSTRACT

Techniques are provided to update a database, in which a browser communicates changes to the database. A change request is received from a browser, and a database update program is executed in response to the change request. The change request may be a page redirect request from a first network address to a second network address, and the database update program replaces the first network address with the second network address in one or more data tables in the database. The change request may also be a web page change request, and the database update program is a trigger program for determining additional programs to be run to update the database.

34 Claims, 5 Drawing Sheets

UPDATING A DATABASE FROM A BROWSER

BACKGROUND OF THE INVENTION

1. Field of the Invention

The present invention generally relates to database management. More particularly, the present invention relates to updating information stored in a database corresponding to a changed network address or a changed web page.

2. Description of the Related Art

It is well known to couple a plurality of computer systems into a network of computer systems. In this way, the collective resources available within the network may be shared amongst users, thus allowing each connected user to enjoy resources which would not be economically feasible to provide to each user individually. With the growth of the Internet, sharing of computer resources has been brought to a much wider audience. The Internet has become a cultural medium in today's society for both information and entertainment. Government agencies employ Internet sites for a variety of informational purposes. For many companies, one or more Internet sites are an integral part of their business; these sites are frequently mentioned in the companies' television, radio and print advertising.

A Uniform Resource Identifier (URI) is a way for identifying a point of content on a network, such as the Internet. The content may be a page of text, a video or sound clip, a still or animated image, or a program. The most common form of URI is the Web page address, which is a particular form or subset of URI called a Uniform Resource Locator (URL). A URI typically describes the mechanism used to access the resource, the specific computer that the resource is housed in, and the specific name of the resource (e.g., a file name) on the computer. A URL is the address of a resource (e.g., file) accessible on the Internet. The type of resource depends on the Internet application protocol. Using the World Wide Web's protocol, the Hypertext Transfer Protocol (HTTP), the resource can be a Hypertext Markup Language (HTML) page, an image file, a program such as a Java applet, or any other file supported by HTTP. The URL contains the name of the protocol required to access the resource (e.g., HTTP), a domain name that identifies a specific computer on the Internet (e.g., www.ibm.com), and a hierarchical description of a file location on the computer (e.g., /products).

The World Wide Web, or simply "the Web", is the Internet's multimedia information retrieval system. It is the most commonly used method of transferring data in the Internet environment. Other methods exist such as the File Transfer Protocol (FTP) and Gopher, but have not achieved the popularity on the Web. Retrieval of information is generally achieved by the use of an HTML-compatible browser at a client machine. When the user of the browser on a client machine specifies a link via a URL, the client machine issues a request to a naming service to map a hostname in the URL to a particular network Internet Protocol (IP) address at which the server is located. The naming service returns a list of one or more IP addresses that can respond to the request. Using one of the IP addresses, the browser establishes a connection to a server. If the server is available, it returns a document or other object formatted according to HTML, for example. Web browsers have become the primary interface for access to many network and server services.

Many web pages are built dynamically from information stored in databases. For instance, when a client machine sends a request for a particular web page, the server for the web page may retrieve contents that make up the web page from a plurality of different locations in a database or from a plurality of different locations in different databases/servers. Also, URLs (or network addresses) that are often used as links on given web pages are stored in databases, for example, using the DATALINK type which is available on the AS/400 from IBM. The server for the web page relies on the accuracy of the stored URLs in its database to provide expeditious retrieval of the contents and to avoid delays which may result from invalid URLs or from URLs having re-direct meta tags or re-direct indicators. However, many of the links (e.g., URLs) stored in databases are apt to change over time because web sites move around from time to time. Furthermore, manually updating information in the database is time consuming and often impractical.

Therefore, a need exists for a method to keep information in a database accurate and up to date. It would be desirable to utilize information from a user's browsing session to update information in a database. Furthermore, it would be desirable to keep information in the database tables up to date without requiring manual intervention.

SUMMARY OF THE INVENTION

Embodiments of the invention generally provide methods, computer systems, and program products to keep information in a database accurate and up to date. One embodiment utilizes information from a user's browsing session to update information in a database. Another embodiment keeps information in the database tables up to date without requiring manual intervention.

One embodiment provides a method for updating a database, comprising: receiving a change request from a browser and executing a database update program in response to the change request. The change request may be a page redirect request from a first network address to a second network address, and the database update program replaces the first network address with the second network address in one or more data tables in the database. The change request may also be a web page change request, and the database update program is a trigger program for determining additional programs to be run to update the database.

Another embodiment provides a computer system comprising a memory containing at least a database management system comprising a database update program and at least one table and a processor which, when executing the database update program, is configured to update the at least one table in response to receiving a change request from a browser. The computer system may further comprise a network connection configured to allow communication with the browser.

Another embodiment provides a method for updating a database, comprising: tunneling to each network address on a list of network addresses; determining one or more changes related to the network address; and updating the database according to the one or more changes. The method may further comprise generating the list of network addresses from the database.

Other embodiments provide a signal bearing medium, comprising a program which, when executed by a processor, performs an operation for updating a database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Embodiments of the invention generally provide methods, computer systems, and program products for updating a database in which a browser communicates changes to the database. In one embodiment, a method for updating information stored in a database corresponding to a changed URL or a changed web page is provided. The database is updated automatically during a browsing session without manual user input of the updated information or data. In another embodiment, a tunneling program is implemented on a database server to determine updates to data tables automatically.

One embodiment of the invention is implemented as a program product for use with a computer system such as, for example, the system 100 shown in FIG. 1 and described below. The program(s) of the program product defines functions of the embodiments (including the methods described below with reference to FIGS. 2-4 and can be contained on a variety of signal/bearing media. Illustrative signal/bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
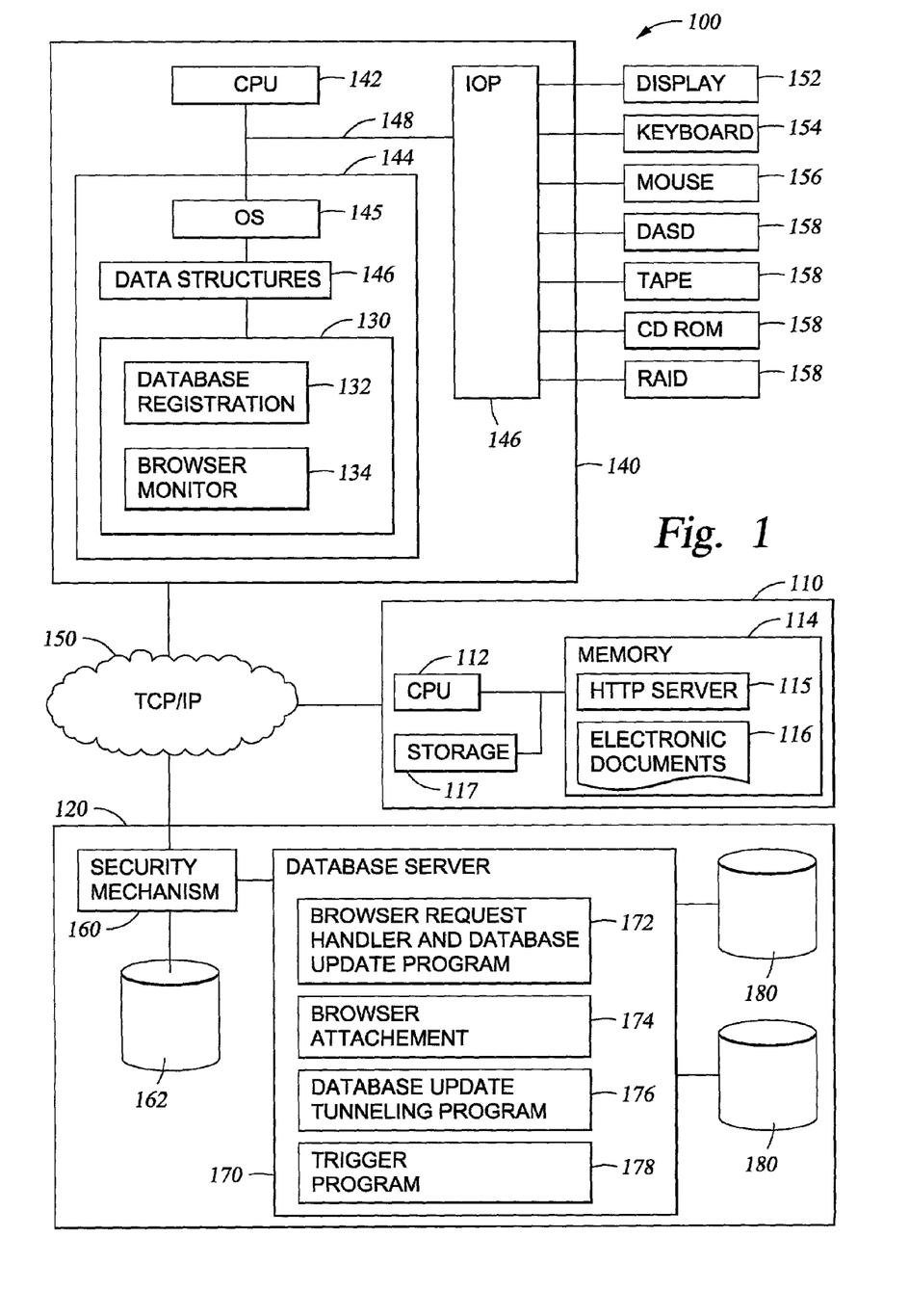
FIG. 1 is a block diagram illustrating one embodiment of a system 100 for updating a database.

FIG. 1 is a block diagram illustrating one embodiment of a system 100 for updating a database. In one embodiment, the system 100 is a client/server system having a client system 140 and a server system 120, and the client server system may be utilized for updating a database 180 residing on the server system 120 from a browser program 130 running on the client system 140. Although the illustrated embodiment includes one client system and one server system, it is understood that other embodiments may include a plurality of client systems and server systems wherein each client system may be utilized to update one or more server systems and each server system may receive update/change requests from one or more client systems. A network connection is established between the client system 140 and the server system 120 through a network 150. The network 150 may be any local area network (LAN) or wide area network (WAN) capable of supporting the appropriate information exchange according to embodiments provided herein. In one particular embodiment, the network 150 is the Internet. The server system 120 may be connected in communication with the client system 140 through Transmission Control Protocol/Internet Protocol (TCP/IP) or other communication protocols.

A plurality of web servers 110 (only one shown) may be accessed by the client system 140 and the server system 120 through the network 150. Each web server 110 generally comprises a CPU 112, a memory 114, and a storage device 117, coupled to one another by a bus 118. Memory 114 is a random access memory sufficiently large to hold the necessary programming and data structures that are located on the server computer 110. As shown, the memory 114 includes a Hypertext Transfer Protocol (http) server process 115 adapted to service requests from the client computer 140. For example, process 115 may respond to requests to access electronic documents 116 (e.g., HTML documents) residing on the web server 110. The http server process 115 is merely illustrative and other embodiments adapted to support any known and unknown protocols are contemplated. The programming and data structures may be accessed and executed by the CPU 112 as needed during operation.

The server system 120 may be a server computer and may generally comprise similar hardware components as described above for the web server system. Additionally, the server system may include a security mechanism 160 at a front end in connection to the network 150. The security mechanism 160 may include a firewall mechanism to protect the server system 120. More generally, the security mechanism 160 may be any combination of hardware and software configured to restrict access to the server system 120. In one embodiment, access may be restricted to registered users. Accordingly, the server system 120 may include a registration information database 162 that is used by the security mechanism 160 to authenticate users requesting access to the server system 120, for example, when a user attaches a browser to the server system as described below. The registration information database 162 may include usernames, user IDs, user physical addresses, user e-mail addresses, user passwords and/or other information.

The server system 120 may include a database server 170 for managing one or more databases 180 connected to the server system 120. The database server 170 includes a browser request handler and database update program 172 that listens for the incoming events (e.g., change requests sent from the browser) and handles them accordingly. The database server 170 may also include one or more trigger programs 178 for responding to particular change requests. In one embodiment, the browser request handler and database update program 172 may be activated by a successful attachment of a browser to the database. Alternatively, the browser request handler and database update program 172 may run as a background program of the database engine on the server system 120. In one embodiment, the database server 170 may be part of a data management system, such as the DB2 database management system available from IBM.

The database server 170 may also include a browser attachment program 174 through which the server system may be attached to a browser by accepting an input for an IP address of the client system running a browser program. In another embodiment, the database server 170 may further include a database update tunneling program 176 through which the database server may tunnel to URLs of interest and access information to update the database. In operation, the database server 170 responds to one or more requests from one or more attached browsers and updates the information stored in the databases accordingly.

The client system 140 may be a personal computer and generally comprises a central processing unit (CPU) 142, a main memory 144, and an input/output (I/O) processor 146. These system components are interconnected through a system bus 148. Input/output devices, such as a display monitor 152, a keyboard 154, and a pointing device 156 (e.g., mouse), are connected to the client system 140 through the I/O processor 146. One or more storage devices 158, such as RAID systems, direct access storage devices (DASDs), tape storage devices, CD-ROM (compact disc read only memory), disk drives and other optical or magnetic storage devices, may be connected to the client system 140 through the I/O processor 146. Data files, software programs, and other information may be stored on the storage devices 158.

One or more software programs, such as an operating system 145, may be stored in the main memory 144 or alternatively, in the storage devices 158. The operating system 145 may be a suitable multitasking operating system; however, those skilled in the art will appreciate that the spirit and scope of the present invention is not limited to any one operating system. Operating system 145 may support a variety of programming environments. Other software programs, such as a browser program 130, may also be stored in the main memory 144, or alternatively, in the storage devices 158. Operation of the computer system 140 may be controlled by user input through I/O devices such as the keyboard 154 and the pointing device 156.

At this point, it is important to note that while embodiments of the present invention have been (and will continue to be) described in the context of fully functional computer systems, those skilled in the art will appreciate that embodiments of the invention are capable of being distributed as a program product via floppy disk, CD ROM, or other form of recordable media, or via any type of electronic transmission mechanism.

The browser program 130, when executed on CPU 142, provides support for navigating between the various web servers 110 and locating network addresses (e.g., URLs) at one or more of the web servers 110. In one embodiment, the browser program 130 is a web-based Graphical User Interface (GUI), which allows the user to display web pages located on the Internet. Memory 144 also comprises various data structures 146 used by the browser program 130, including, for example, a homepage network address data structure, a bookmark data structure, a toolbar configurations data structure, and a visited network address data structure.

The browser program 130 on the client system 140 may include a database registration program 132 and a browser monitor program 132. In one embodiment, the database registration program 132 is a user interface which allows a user to attach a database to a browser. The database may be attached to the browser through a typical login process, e.g., by providing valid login information with administration authorities to the database. Typical database administration login programs may be utilized to attach a database to a browser.

Figure 2:
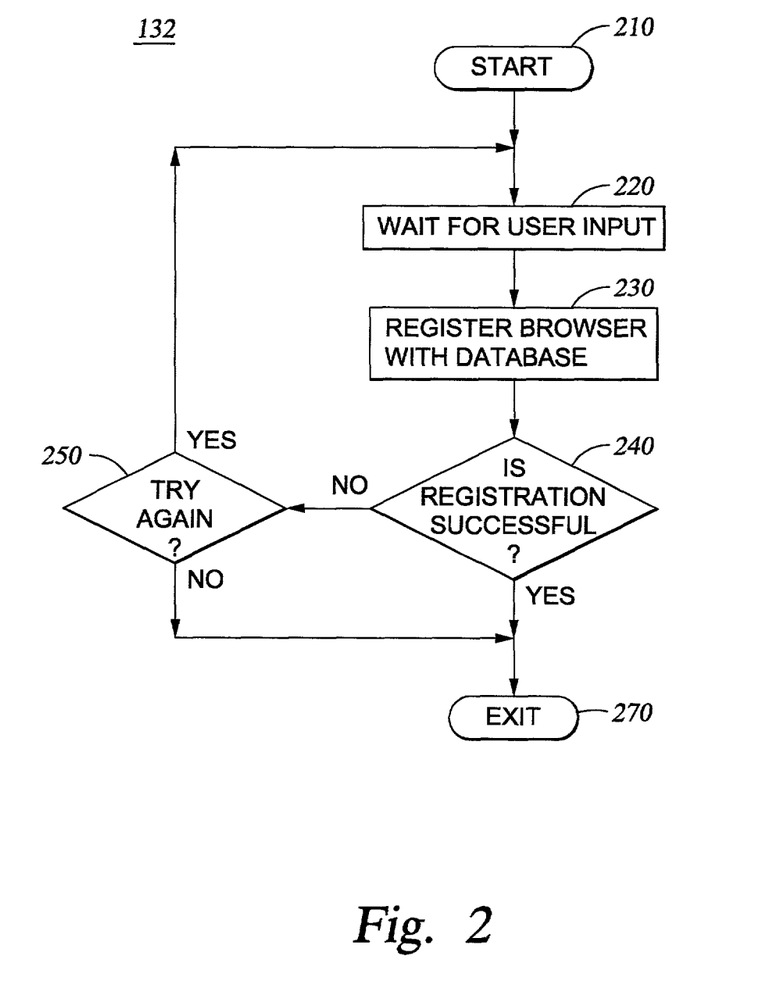
FIG. 2 is a flow chart illustrating one embodiment of a database registration program 132.

FIG. 2 is a flow chart illustrating one embodiment of a database registration program 132. The database registration program 132 starts at block 210 and proceeds at block 220 to wait for user input of information such as login name, password, and database information, which may be needed to attach a particular database to the browser. The database registration program 132 then registers the browser with the database at block 230 and determines whether the database is attached to the browser successfully at block 240. If the database is not attached to the browser successfully, then the database registration program 132 displays the error encountered in registering the browser with the database and prompts the user to try again or exit, as indicated by block 250. If the user elects to try again at block 250, the database registration program 132 returns to block 220 and waits for user input of registration information. If the user selects to exit at block 250, the database registration program 132 proceeds to exit at block 270. Referring back to block 240, if the database is attached to the browser successfully, then the database registration program 132 exits at block 270. In an alternative embodiment, database registration program 132 may be implemented on the server system 120 in which the server system 120 may be attached to a browser by accepting an input for an IP address of the client system 140.

Figure 3:
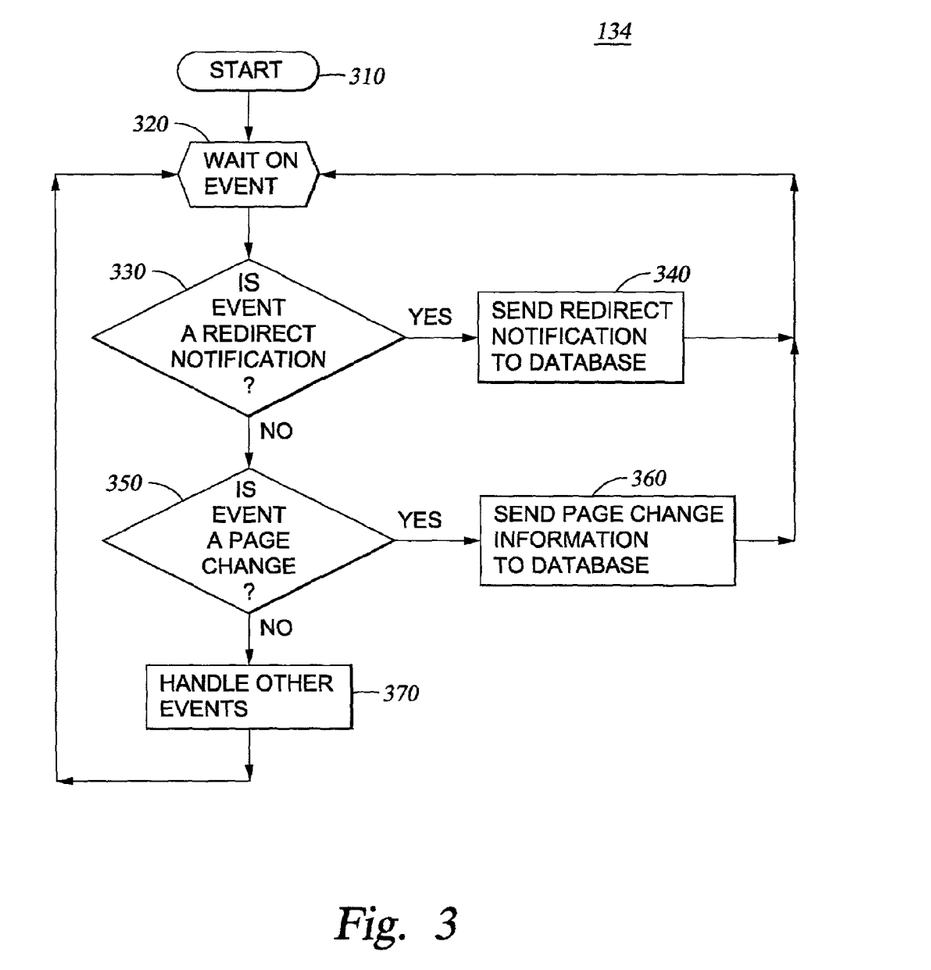
FIG. 3 is a flow chart illustrating one embodiment of a browser monitor program 134.

The browser monitor program 134 may be run as a background program of the browser program 130. The browser monitor program 134 determines whether a redirect for a web page exists (e.g., redirect metatag from a first URL to a second URL). The browser monitor program 134 may also determine whether a web page has changed. In either case, if one of these events is found to be true, then a change request (e.g., a re-direct request and a page change request) is sent to all registered databases that are attached to this client.

FIG. 3 is a flow chart illustrating one embodiment of a browser monitor program 134. The browser monitor program 134 starts at block 310 and proceeds to block 320 to wait for an event in the browser program 130. An event may be any operation performed in the browser program 130. For example, an event may be an operation for processing an HTML tag. After an event has occurred, the browser monitor program 134 determines whether the event is a redirect notification from a web server 110 at block 330. In one embodiment, the browser monitor program 134 determines whether a redirect meta tag (i.e., a coding statement in HTML that describes an URL change for the Web page) has been received from a web server 110. If the event is a redirect notification, the browser monitor program 134 sends a redirect request to each attached database at block 340, and the browser monitor program 134 returns to block 320 to wait on another event. The redirect request may include information about the redirect notification, including, for example, a first URL (e.g., an outdated URL) and a second URL (e.g., a current/updated URL). If the event is not a redirect notification, the browser monitor program 134 proceeds to determine whether the event is a page change event at block 350. Several methods may be utilized to determine a web page change, including, for example, performing a CRC (i.e., cyclic redundancy code) check. Other methods for determining a web page change may check for differences or changes in any of the following attributes: the web page length, the images used in the web page, the links provided in the web page, the "last modified" timestamp or date-stamp, any html tag (e.g., a page expiration tag), and certificates attached to the page (e.g., internet security certificates). Also, a URL which remains the same but points to a different IP address may also constitute a web page change. As such, the degree and nature of the change monitored by the browser monitor program 134 may be varied according to a desired implementation. Further, the browser monitor program 134 may include one or more web page change methods to determine a page change event.

If the event is a page change event, the browser monitor program 134 sends a page change request to each attached database at block 360, and the browser monitor program 134 returns to block 320 to wait on another event. The page change request may include information about the page change, including, for example, changes in contents, links, and layout of the web page. If the event is not a page change event, then the browser monitor program 134 proceeds to handle the event normally at block 370 and then returns to block 320 to wait on another event.

Figure 4:
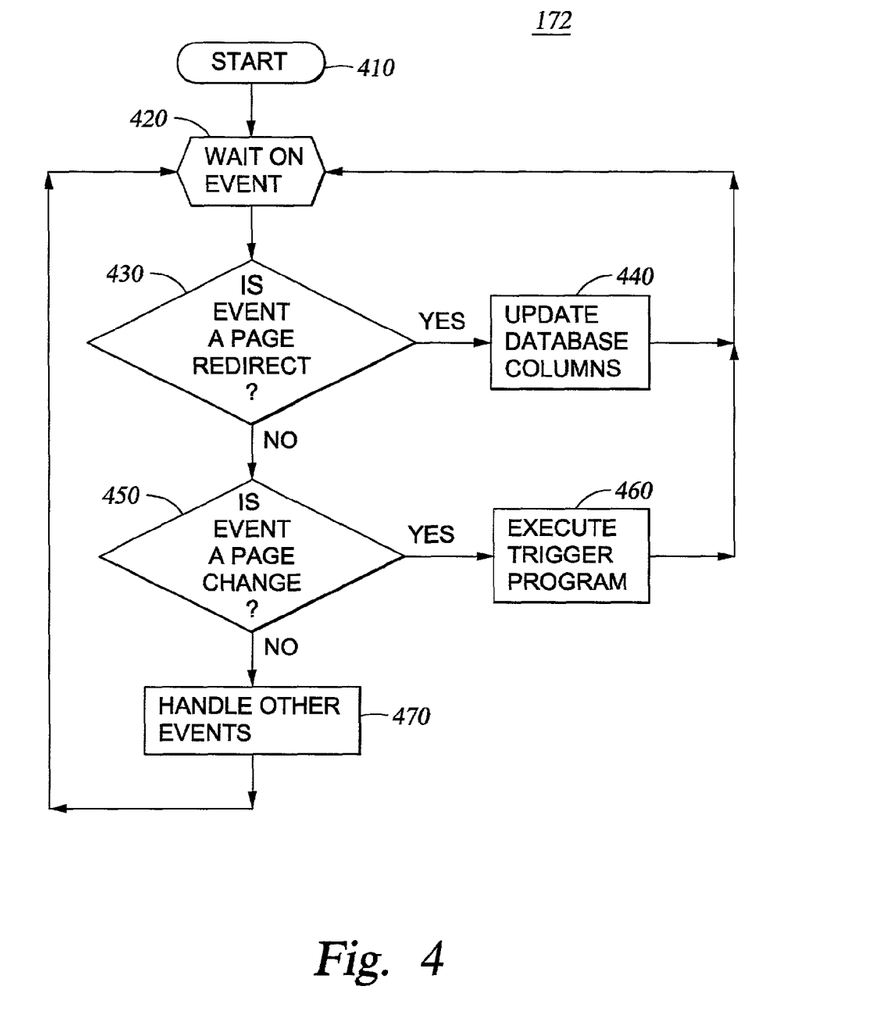
FIG. 4 is a flow chart illustrating one embodiment of a browser request handler and database update program 172.

The change request sent by the browser monitor program is received by an attached server system utilizing a browser request handler and database update program 172. FIG. 4 is a flow chart illustrating one embodiment of a browser request handler and database update program 172. The browser request handler and database update program 172 starts at block 410 and waits for a browser request event at block 420. After receiving a browser request event, the browser request handler and database update program 172 proceeds to block 430 to determine whether the event is a page redirect request. If the event is a page redirect request, the browser request handler and database update program 172 proceeds to block 440 to update one or more data tables in the database. In one embodiment, the page redirect request is received from the browser monitor program 134 and contains information for the page redirect, including, for example, a first URL (e.g., an outdated URL) and a second URL (e.g., a current/updated URL), and the browser request handler and database update program 172 may store the current/updated URL in place of the outdated URL for each data table in the database containing the outdated URL. After updating the database in block 440, the browser request handler and database update program 172 returns to block 420 to wait for another browser request event.

In another embodiment, the data tables in the database may include a field to indicate whether automatic updates are allowed. In this case, the browser request handler and database update program verifies whether the automatic update is allowed for each data table and proceeds to update only those data tables that allow automatic updates.

Referring back to block 430, if the event is not a page redirect request, the browser request handler and database update program 172 proceeds to block 450 to determine whether the event is a page change request. If the event is a page change request, the browser request handler and database update program 172 proceeds to block 460 to execute a trigger program 178 which updates one or more data tables in the database to reflect the changes in the web page. In one embodiment, the page change request is received from the browser monitor program 134 and contains information about the page change, including, for example, changes in contents, links, and layout of the web page, and the browser request handler and database update program 172 executes a trigger program 178 in response to the page change request. One or more trigger programs 178 may be utilized to respond to different web change events. For example, a main trigger program may determine the types of web page change event and select an appropriate sub trigger program for responding to the particular web page change event. After executing the trigger program in block 460, the browser request handler and database update program 172 returns to block 420 to wait for another browser request event.

Referring back to block 450, if the event is not a page change request, the browser request handler and database update program 172 proceeds to block 470 to process other events and returns to block 420 to wait for another browser request event.

In one embodiment as described referring to FIGS. 1-4, the browser program communicates the page redirect request and the page change request in real time automatically (i.e., the browser monitor program may run as a background program which determines the page redirect/change event and sends the browser request to the server system 120). In an alternative embodiment, if the browser is not attached to a server system during a browsing session, the browser monitor program may store change requests and data for the page redirect/changes, and the user may attach the browser at a later time to send the stored change requests to the database server.

Figure 5:
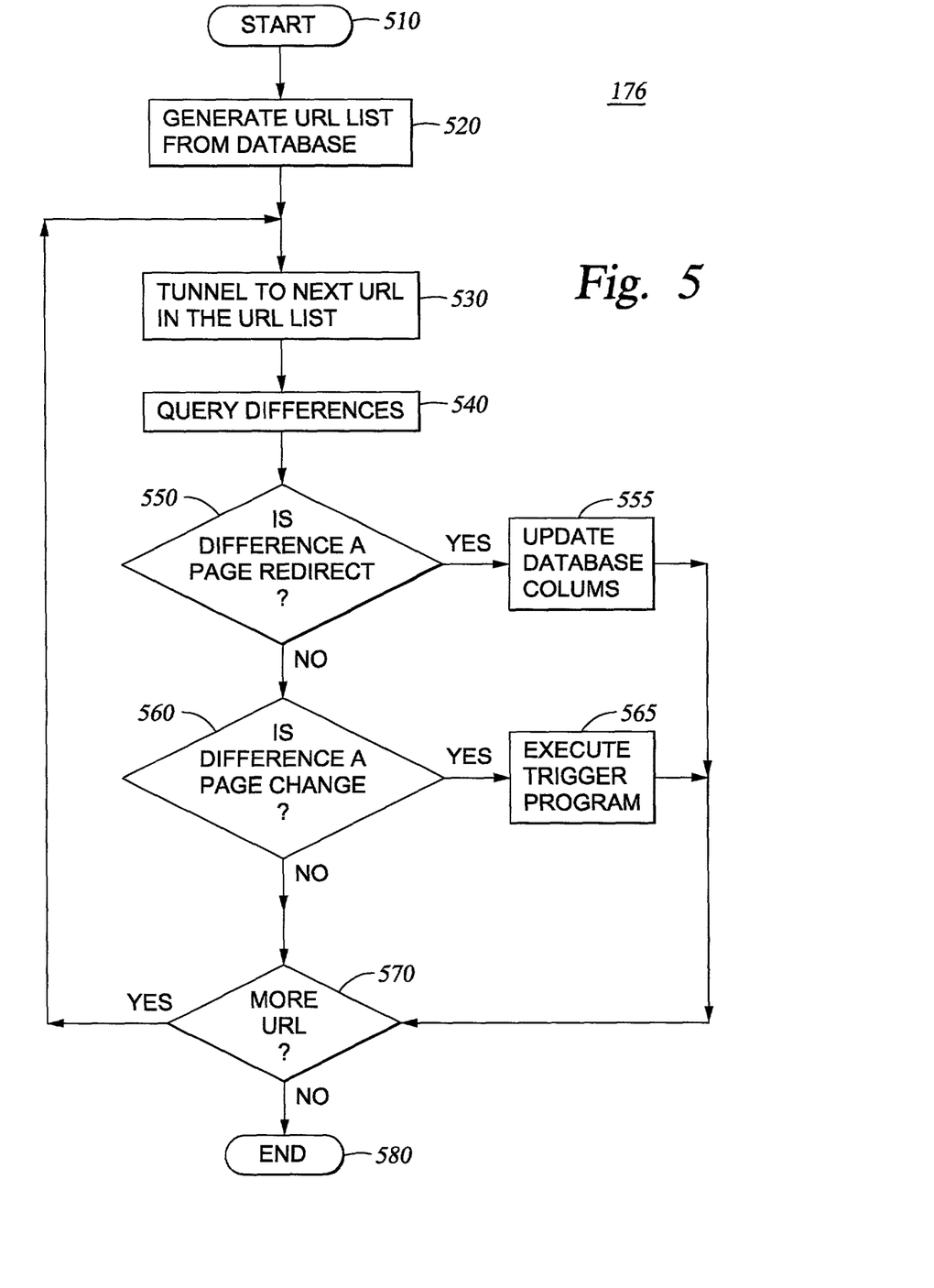
FIG. 5 is a flow chart illustrating one embodiment of a database update tunneling program 176.

In another embodiment, an individual database may run a tunneling program 176 to determine page redirects and web page changes, and then update appropriate data tables in the database. In this embodiment, the database may create a cross reference of all the URLs of interest (e.g., URLs stored as links in the database) and then utilize the tunneling program 176 to access these URLs to determine whether updates are needed to reflect changes in URL and/or page content. FIG. 5 is a flow chart illustrating one embodiment of a database update tunneling program 176. In one embodiment, the database update tunneling program 176 may be a background program which is run periodically (e.g., initiated by a schedule or maintenance program) or when a database is initiated or started. Alternatively, the database update tunneling program 176 may be initiated by user request. The database update tunneling program 176 begins at block 510 and proceeds to generate a list of URLs of interest from the database at block 520. The database update tunneling program 176 then tunnels to the next URL on the list (starting with the first URL on the list) to access the URL at block 530 and query the changes and/or differences at block 540. To determine the changes and/or differences, the database update tunneling program 176 may perform one or more of the following checks: detecting re-direct meta tags, performing a CRC (i.e., cyclic redundancy code) check, checking for differences or changes in the web page length, the images used in the web page, the links provided in the web page, the "last modified" timestamp or date-stamp, any html tag (e.g., a page expiration tag), and certificates attached to the page (e.g., internet security certificates), and determining whether a URL which remains the same but points to a different IP address.

The database update tunneling program 176 then determines whether the difference is a page redirect at block 550. If the difference is a page redirect, the database update tunneling program 176 updates appropriate data tables in the database with the new URL at block 555 and proceeds to block 570. If the difference is not a page redirect, the database update tunneling program 176 proceeds to determine whether the difference is a page change at block 560. If the difference is a page change, then the database update tunneling program 176 proceeds to execute trigger programs to update the page change information at block 565 and proceeds to block 570.

If the difference is not a page change, then the database update tunneling program 176 proceeds to block 570 and determines whether there are more URLs on the generated URL list. If so, the database update tunneling program 176 returns to block 530 to tunnel to the next URL. If there are no more URLs on the list, the database update tunneling program 176 has completed the database update and ends at block 580.

While the foregoing is directed to embodiments of the present invention, other and further embodiments of the invention may be devised without departing from the basic scope thereof, and the scope thereof is determined by the claims that follow.

What is claimed is:

1. A computer-implemented method to programmatically update a database stored on a server system and containing information about one or more web pages, based on operations of a web browser program executing on a client system and when browsing the one or more web pages, the method comprising:
    detecting, by a browser monitor component of the web browser program, an event indicating a change involving a web page, of the one or more web pages, in response to receiving information about the one or more web pages, the information relating to operations of the web browser program executing on the client system, in browsing the one or more web pages, wherein the indicated change is caused by operation of the web browser program; and
    upon detecting the event and by operation of one or more computer processors, sending a notification to a request handler component of the database containing the information and stored on the server system, to cause the information about the web page to be programmatically updated to reflect the change indicated by the detected event;
    wherein the notification is sent to the database to cause the information about the web page to be programmatically updated to reflect the change indicated by the detected event, without requiring any user input specifying to send the notification to the database, wherein the web browser program includes a database registration component configured to securely attach the web browser program to the database through a predefined login process.

2. The computer-implemented method of claim 1, further comprising:
    verifying whether a data table in the database allows automatic updates, before sending the notification.

3. The computer-implemented method of claim 1, further comprising:
    attaching the database to the web browser through a login process.

4. The computer-implemented method of claim 3, wherein the web browser resides on a client system, and wherein the database resides on a server system.

5. The computer-implemented method of claim 1, wherein the event comprises receiving, from a web server, a page redirect request to change a uniform resource locator (URL) of a web page from a first network address to a second network address.

6. The computer-implemented method of claim 5, wherein the notification sent to the database requests replacement of the first network address with the second network address in one or more data tables in the database.

7. The computer-implemented method of claim 5, wherein the first and second network addresses are utilized as links on a web page.

8. The computer-implemented method of claim 1;
    wherein the database server includes a browser attachment component, a tunneling program component, and a trigger program component.

9. The computer-implemented method of claim 8, wherein the browser request handler is configured to verify whether a first data table in the database allows automatic updates before sending the notification, wherein the notification is sent upon verifying that the first data table allows automatic updates, wherein a notification pertaining to a second data table is not sent upon verifying that the second data table does not allow automatic updates, wherein each notification comprises a change request;
    wherein the browser attachment component is configured to attach the database to the web browser based on input from a user of the database, specifying a network address of the client system that executes the web browser;
    wherein the predefined login process involves a user of the web browser, different from the user of the database.

10. The computer-implemented method of claim 9, wherein the browser monitor component is configured to:
    detect each event selected from a first event type comprising a change in content of the web page and a second even type comprising receiving, from a web server, a page redirect request to change a uniform resource locator (URL) of a web page from a first network address to a second network address;
    upon determining, at a first point in time, that the web browser is not attached to the database server, storing the notification for transmission to the database server once the web browser is attached to the database server, wherein the web browser is attached to the database server at a second point in time subsequent to the first point in time; and
    upon determining, at the first point in time, that the web browser is attached to the database server, transmitting the notification to the database server prior to the second point in time.

11. The computer-implemented method of claim 10, wherein the notification sent to the database requests replacement of the first network address with the second network address in one or more data tables in the database, wherein the first and second network addresses serve as links on a web page, wherein the notification sent to the database contains sufficient information to update the database to reflect a plurality of changes in the web page, the plurality of changes including the change in the web page.

12. The computer-implemented method of claim 11, wherein the tunneling program component is configured to:
    programmatically access each network address on a list of network addresses referenced in the database, without requiring user input specifying to access any of the network addresses;
    determining, based on the access of the network addresses, one or more changes in location or content of a web page associated with a network address of the accessed network addresses, wherein the one or more changes are not user-specified; and
    programmatically update the database to reflect the determined one or more changes and by operation of one or more computer processors, without requiring any user input specifying to update the database to reflect the determined one or more changes.

13. The computer-implemented method of claim 12, wherein determining one or more changes in location or content related to a web page associated with each network address accessed comprises detecting a page redirect from a first network address to a second network address;
    wherein the database is updated to replace the first network address with the second network address in one or more data tables in the database, wherein updating the database comprises: (i) determining, by the trigger program component and based on the information contained in the change request, one or more trigger programs to be executed to update the database; and (ii) executing, by the trigger program component, the determined one or more trigger programs according to the one or more changes related to the network address;

wherein the browser monitor component is configured to detect events based on each detection operation selected from: (i) detecting a change in a size of the web page; (ii) detecting a change in an image included in the web page; (iii) detecting a change in a link contained in the web page; (iv) detecting a change in a last-modified timestamp of the web page; (v) detecting a change in a page expiration tag contained in the web page, wherein the page expiration tag is composed using a predefined markup language; (vi) detecting a change in a network security certificate attached to the we page; (vii) detecting a change in content of the web page; and (viii) detecting a change in layout of the web page.

14. A computer-readable storage medium comprising a program which, when executed, performs an operation to programmatically update a database stored on a server system and containing information about a set of web pages, based on operations of a web browser executing on a client system and when browsing the set of web pages, the operation comprising:

receiving, by a request handler component of the database stored on the server system, a change request from the web browser executing on the client system, the change request indicating that a browser monitor component of the web browser has, when browsing the set of web pages, detected a change involving a web page of the set of web pages, wherein the change is caused by operation of the web browser; and responsive to the change request and by operation of one or more computer processors when executing the program, programmatically updating the database based on information contained in the change request, to reflect the detected change;

wherein the change request is sent to the database to cause the database to be programmatically updated to reflect the detected change, without requiring any user input specifying to send the change request to the database, wherein the web browser program includes a database registration component configured to securely attach the web browser program to the database through a predefined login process.

15. The computer-readable storage medium of claim 14, wherein the operation further comprises verifying whether a data table in the database allows automatic updates, before updating the data table.

16. The computer-readable storage medium of claim 14, wherein the operation further comprises attaching the database to the web browser.

17. The computer-readable storage medium of claim 16, wherein the web browser is on a client system, and wherein the database is connected to a server system.

18. The computer-readable storage medium of claim 14, wherein the information contained in the change request indicates the web browser detected a redirect notification from a server redirecting the web page from a first network address to a second network address.

19. The computer-readable storage medium of claim 18, wherein the updating comprises replacing the first network address with the second network address in one or more data tables in the database.

20. The computer-readable storage medium of claim 18, wherein the first and second network addresses are utilized as links on a web page.

21. A computer system to programmatically update a database stored on the computer system and containing information about a set of web pages, based on operations of a web browser executing on a client system and when browsing the set of web pages, the computer system comprising:

the database stored on the computer system and containing information about the set of web pages;

a memory containing at least a database management system comprising a database update program; and a processor which, when executing the database update program, is configured to programmatically update, in the database, at least one table containing information about a web page of the set of web pages, in response to receiving a change request from the web browser executing on the client system, the change request containing information indicating that a browser monitor component of the web browser detected a change event indicating a change involving the web page, wherein the indicated change is caused by operation of the web browser, wherein the at least one table is updated to reflect the change;

wherein the change request is sent to the database to cause the information about the web page to be programmatically updated to reflect the change indicated by the detected change event, without requiring any user input specifying to send the change request to the database, wherein the web browser includes a database registration component configured to securely attach the web browser to the database through a predefined login process.

22. The computer system of claim 21, further comprising a network connection configured to allow communication with the web browser after a secure attachment procedure.

23. The computer system of claim 21, wherein the information indicating the web browser detected a change event related to the web page comprises an indication the web browser detected a change to the content or layout of the web page.

24. The computer system of claim 23, wherein the processor is configured to execute a trigger program for determining additional programs to be run to update the database, based on the information contained in the change request.

25. The computer system of claim 21, wherein the processor is further configured to verify whether the data table in the database allows automatic updates before updating the data table.

26. The computer system of claim 21, wherein information contained in the change request indicates receipt by the web browser of a page redirect request from a first network address to a second network address, and wherein the processor is configured to replace the first network address with the second network address in one or more data tables in the database.

27. The computer system of claim 21, wherein the processor is configured to execute a trigger program for determining additional programs to be run to update the database to reflect multiple changes indicated in the information contained in the change request.

28. The computer system of claim 21, wherein the processor is configured to execute multiple sub-trigger programs to update the database to reflect the multiple changes indicated in the information contained in the change request.

29. A computer-implemented method to programmatically update a database stored on a database server system and containing references to network addresses, based on programmatic accesses to the network addresses without requiring any user browsing activity, the method comprising:

programmatically accessing, by a tunneling program component of the database server system, each network address on a list of network addresses referenced in the database stored on the database server system, without requiring any user browsing activity;

determining one or more changes in location or content of a web page associated with a network address, of the accessed network addresses, wherein the web page is stored on a web server system identified by the network address, wherein the one or more changes are caused by application operation; and programmatically updating the database by a trigger program component of the database server system, to reflect the determined one or more changes and by operation of one or more computer processors, without requiring any user input specifying to update the database to reflect the determined one or more changes, wherein programmatically updating the database comprises:

determining, by the trigger program component and based on the determined one or more changes, one or more trigger programs to be executed to update the database; and executing the determined one or more trigger programs according to the one or more changes in location or content of the web page associated with the network address.

30. The computer-implemented method of claim 29, further comprising:

generating the list of network addresses from the database.

31. The computer-implemented method of claim 29, wherein determining one or more changes in location or content of a web page associated with each network address accessed comprises detecting a page redirect from a first network address to a second network address, and wherein the database is updated to replace the first network address with the second network address in one or more data tables in the database.

32. A computer-readable storage medium comprising a program which, when executed, performs an operation to programmatically update a database stored on a database server system and containing references to network addresses, based on programmatic accesses to the network addresses without requiring any user browsing activity, the operation comprising:

programmatically accessing, by a tunneling program component of the database server system, each network address on a list of network addresses referenced in the database stored on the database server system, without requiring any user browsing activity;

determining one or more changes in location or content of a web page associated with a network address, of the accessed network addresses, wherein the web page is stored on a web server system identified by the network address, wherein the one or more changes are caused by application operation; and programmatically updating the database by a trigger program component of the database server system, to reflect the determined one or more changes and by operation of one or more computer processors when executing the program, without requiring any user input specifying to update the database to reflect the determined one or more changes, without requiring any user input specifying to update the database to reflect the determined one or more changes, wherein programmatically updating the database comprises:

determining, by the trigger program component and based on the determined one or more changes, one or more trigger programs to be executed to update the database; and executing the determined one or more trigger programs according to the one or more changes in location or content of the web page associated with the network address.

33. The computer-readable storage medium of claim 32, wherein the operation further comprises:

generating the list of network addresses from the database.

34. The computer-readable storage medium of claim 32, wherein determining one or more changes in location or content of a web page associated with each network address accessed comprises detecting a page redirect from a first network address to a second network address, and wherein the database is updated to replace the first network address with the second network address in one or more data tables in the database.

* * * * *